(12) United States Patent
Maksuti

(10) Patent No.: US 11,887,449 B2
(45) Date of Patent: Jan. 30, 2024

(54) PROGRAMMABLE INFRARED SECURITY SYSTEM

(71) Applicant: Elvis Maksuti, Hot Springs, AR (US)

(72) Inventor: Elvis Maksuti, Hot Springs, AR (US)

(*) Notice: Subject to any disclaimer, the term of this patent is extended or adjusted under 35 U.S.C. 154(b) by 0 days.

(21) Appl. No.: 15/935,484

(22) Filed: Mar. 26, 2018

(65) Prior Publication Data

US 2019/0019384 A1   Jan. 17, 2019

Related U.S. Application Data

(60) Provisional application No. 62/531,942, filed on Jul. 13, 2017.

(51) Int. Cl.
```
G08B 13/196    (2006.01)
G08B 13/19     (2006.01)
G08B 7/06      (2006.01)
G07C 9/00      (2020.01)
G08B 21/18     (2006.01)
H04N 23/51     (2023.01)
```

(52) U.S. Cl.
CPC ... G08B 13/19613 (2013.01); G07C 9/00174 (2013.01); G08B 7/06 (2013.01); G08B 13/19 (2013.01); G08B 13/19619 (2013.01); G08B 13/19643 (2013.01); G08B 13/19669 (2013.01); G08B 21/182 (2013.01); H04N 23/51 (2023.01)

(58) Field of Classification Search
CPC .... G08B 13/19613; G08B 7/06; G08B 13/19; G08B 13/19643; G08B 13/19669; G07C 9/00174; H04N 5/2252
USPC .......................................................... 348/152
See application file for complete search history.

(56) References Cited

U.S. PATENT DOCUMENTS

| | | | |
|---|---|---|---|
| 5,289,275 A | 2/1994 | Shii et al. | |
| 6,359,582 B1 | 3/2002 | MacAleese et al. | |
| 6,476,391 B1 | 11/2002 | Zhang | |
| 6,690,011 B2 | 2/2004 | Watanabe et al. | |
| 6,875,225 B1* | 4/2005 | Pederson | A61M 21/00 607/88 |
| 7,109,470 B2 | 9/2006 | Köhler | |
| 7,469,060 B2 | 12/2008 | Bazakos et al. | |
| 7,657,092 B2 | 2/2010 | Gorian et al. | |
| 9,826,152 B1* | 11/2017 | Martin | G02B 13/06 |
| 2005/0271250 A1* | 12/2005 | Vallone | H04N 21/44008 382/103 |
| 2008/0099678 A1* | 5/2008 | Johnson | G01J 5/02 250/332 |
| 2008/0309510 A1* | 12/2008 | Mandagaran | B60R 1/1207 340/815.45 |
| 2010/0180480 A1* | 7/2010 | Mehrabi-Nejad | G06Q 30/02 40/607.01 |
| 2012/0287613 A1* | 11/2012 | Hamel | F21V 29/004 362/184 |

(Continued)

*Primary Examiner* — Matthew David Kim

(74) *Attorney, Agent, or Firm* — Boudwin Intellectual Property Law, LLC; Daniel Boudwin

(57) ABSTRACT

A security system. The security system has a camera operated by a microcontroller. The microcontroller has a logic to scan the images collected by the camera and determine if a dangerous event is happening. After a dangerous event is identified, the microcontroller activates a security system. The security system will activate several functional features including a speaker, a light and a door lock.

11 Claims, 4 Drawing Sheets

(56) References Cited

U.S. PATENT DOCUMENTS

| | | | | |
|---|---|---|---|---|
| 2013/0278759 A1* | 10/2013 | Zimmermann | ............ | G01C 7/00 |
| | | | | 348/140 |
| 2014/0218888 A1* | 8/2014 | Chen | ..................... | H04N 7/183 |
| | | | | 362/8 |
| 2014/0253725 A1* | 9/2014 | Hsu | .................... | H04N 5/23241 |
| | | | | 348/143 |
| 2015/0193651 A1* | 7/2015 | Gleim | ................ | G06K 9/00295 |
| | | | | 382/118 |
| 2016/0019427 A1* | 1/2016 | Martin | ............... | G06K 9/00771 |
| | | | | 382/103 |
| 2016/0110980 A1* | 4/2016 | Aggarwal | ................ | G01J 5/10 |
| | | | | 250/338.5 |
| 2016/0161339 A1* | 6/2016 | Tan | ....................... | G01J 5/0025 |
| | | | | 702/150 |
| 2016/0284182 A1* | 9/2016 | Havens | .................. | G08B 15/00 |
| 2017/0024998 A1* | 1/2017 | Liu | ...................... | G08B 29/185 |
| 2017/0041535 A1* | 2/2017 | Nguyen | ............. | H04N 23/90 |
| 2017/0079257 A1* | 3/2017 | Haensgen | ............. | H04W 84/18 |
| 2017/0099464 A1* | 4/2017 | Qu | ......................... | H04N 23/71 |
| 2017/0132889 A1* | 5/2017 | Carskadon | ............. | G08B 13/19 |
| 2017/0195533 A1* | 7/2017 | Seo | ........................ | H04N 23/55 |
| 2017/0244934 A1* | 8/2017 | Chien | .................... | H04N 7/183 |
| 2017/0349192 A1* | 12/2017 | Murdaugh | .............. | B61L 5/125 |
| 2018/0103200 A1* | 4/2018 | Bracy | .................... | G08G 1/095 |

* cited by examiner

PROGRAMMABLE INFRARED SECURITY SYSTEM

CROSS REFERENCE TO RELATED APPLICATIONS

This application claims the benefit of U.S. Provisional Application No. 62/531,942 filed on Jul. 13, 2017. The above identified patent application is herein incorporated by reference in its entirety to provide continuity of disclosure.

BACKGROUND OF THE INVENTION

The present invention relates to a programmable infrared security system. Residential buildings and commercial buildings, such as shops, banks, schools, airports and government buildings are commonly the targets of crimes and require security systems to amply provide security to the persons and property therein. Many of these buildings are equipped with surveillance cameras or are manned by security guards. However, these types of security systems may fail to detect dangerous weapons or activities until a dangerous event is already underway.

Many buildings use metal detectors to detect dangerous weapons such as firearms and knives to prevent violence from occurring on the premises. However, metal detectors provide inconvenience for consumers and other visitors where long lines are formed behind them, individuals are required to remove items such as keys, shoes and belts among others. Because of this inconvenience, many buildings, specifically shops and banks, may lose business due thereto.

Therefore, there is a defined need in the known art for a security system that is both effective in identifying and alerting individuals to a dangerous event as well as unobtrusive so as to provide comfort to individuals visiting the building protected by the security system.

SUMMARY OF THE INVENTION

In view of the foregoing disadvantages inherent in the known types of security systems now present in the known art, the present invention provides a security system wherein the same can be utilized for providing convenience for the user when monitoring an area for dangerous events.

The present system comprises a camera operably connected to a microcontroller. The camera is configured to record a video and infrared temperature of a defined area. The microcontroller is configured to perform a logic, wherein the defined area is monitored for movement changes and temperature changes. A database is stored on the microcontroller, wherein a plurality of event thresholds corresponding to movement changes and temperature changes are classified. An event that surpasses an event threshold of the plurality of event thresholds triggers an identification of the event. The identification of the event is configured to activate an alarm system. Activation of the alarm system actuates a door lock that is operably connected to the microcontroller and emits an audible sound from a speaker operably connected to the microcontroller.

An additional object of the present invention is to provide a database containing visual identifiers of a plurality of weapons, wherein an event threshold of the plurality of event thresholds is surpassed upon an identification of a weapon of the plurality of weapons.

Another object of the present invention is to provide an alarm system that is configured to activate a light operably connected to the microcontroller.

Yet another object of the present invention is to provide an alarm system configured to activate a video recording device operably connected to the microcontroller and to store the recorded video on a storage unit operably connected to the microcontroller.

A further object of the present invention is to provide a camera wherein the camera, the light and the speaker are disposed within a single housing.

An additional object of the present invention is to provide a camera wherein the camera, the light and the speaker are disposed on a single housing, and an adjustable arm member is configured to enable more efficient positioning of the housing Yet another object of the present invention is to provide a microcontroller operably connected to a monitor configured to show a video feed gathered by the camera.

A further object of the present invention is to provide a monitor capable of being operably changeably between an unfiltered video feed and an infrared video feed.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
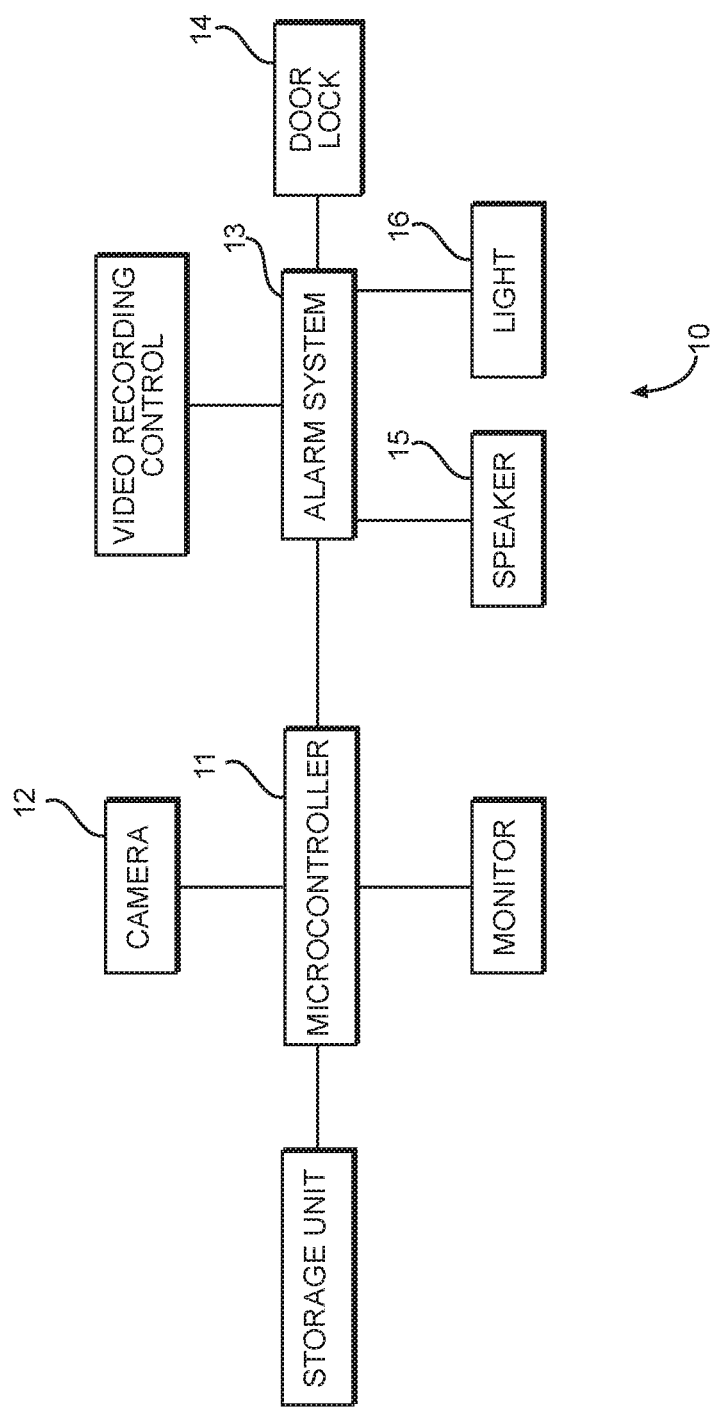
FIG. 1 shows a block diagram of an embodiment of the programmable infrared security system.

Reference is made herein to the attached drawings. Like reference numerals are used throughout the drawings to depict like or similar elements of the programmable infrared security system. The figures are intended for representative purposes only and should not be considered to be limiting in any respect.

Referring now to FIG. 1, there is shown a block diagram of an embodiment of the programmable infrared security system. The programmable infrared security system 10 is operated through the actions of a microcontroller 11 upon a plurality of functional components. A camera 12 is operably connected to the microcontroller 11 and the camera 12 comprises an image sensor configured to capture an image of a defined area. The image has both a spatial element and an infrared temperature element. A nonlimiting example of the spatial element relates to shape and location of objects gathered from the camera 12 and a nonlimiting example of the infrared temperature element relates to captured infrared radiation properties, such as frequency and amplitude. The defined area is an area where the camera is positioned to capture a view thereof. The camera 12 is any suitable camera for capturing both the spatial image and the infrared temperature of the defined area. In one embodiment, the system comprises both a conventional camera and a separate infrared camera, each in operably connection with the microcontroller 11.

An alarm system 13 is in operable connection with the microcontroller 11. The alarm system comprises a plurality of security mechanisms configured to be activated upon actuation by the microcontroller 11. A door lock 14 is operably connected to the microcontroller 11, such that activation of the alarm system 13 will place the door lock 14 in a locked position from an unlocked position. In the locked position, a door is locked wherein the door will not be opened except through an authorized unlock action, such as unlocking with a key or inputting a previously-designated code.

Furthermore, the alarm system 13 comprises a speaker 15. The speaker 15 is configured to emit an audible sound therefrom upon activation of the alarm system 13. The audible sound is any audible sound that is designated by an individual managing the programmable infrared security system, such as a conventional alarm sound or a prerecorded voice message.

In one embodiment, the alarm system 13 further comprises at least one light 16. The light 16 is comprised of a bulb and a filament. Activation of the alarm system 13 by the microcontroller 11 will further activate a power source operably connected to the light 16, such that the light 16 will be lit when the alarm system 13 is activated.

The microcontroller is configured to perform a logic that is at least partially stored in a non-transitory computer readable medium and that, when executed at least in part by a processor, causes the power control system to perform a method. In one embodiment, at least one database is stored on the microcontroller. In one embodiment, the database is stored in part, or fully, on a network or cloud. The security system comprises a plurality of event thresholds thereon. Each event threshold corresponds to an event, such as a change in a recorded movement of the spatial element, a change in an infrared temperature as recorded by the camera, or a combination thereof. Furthermore, each event threshold of the plurality of event thresholds defines at least one parameter, wherein once each required parameter is met, the event is identified. Once an event is identified, the alarm system is activated.

In one embodiment, the microcontroller comprises a database having a set of weapon profiles stored thereon. The database of weapon profiles comprises the plurality of event thresholds wherein an event threshold is met upon the identification of a weapon from the set of weapon profiles. Upon the identification of a weapon, the alarm system is activated.

In another embodiment, the microcontroller is configured to further activate a recording protocol, such that a recording of an event is created when an event threshold is surpassed. The recording is stored on a storage unit.

Figure 2:
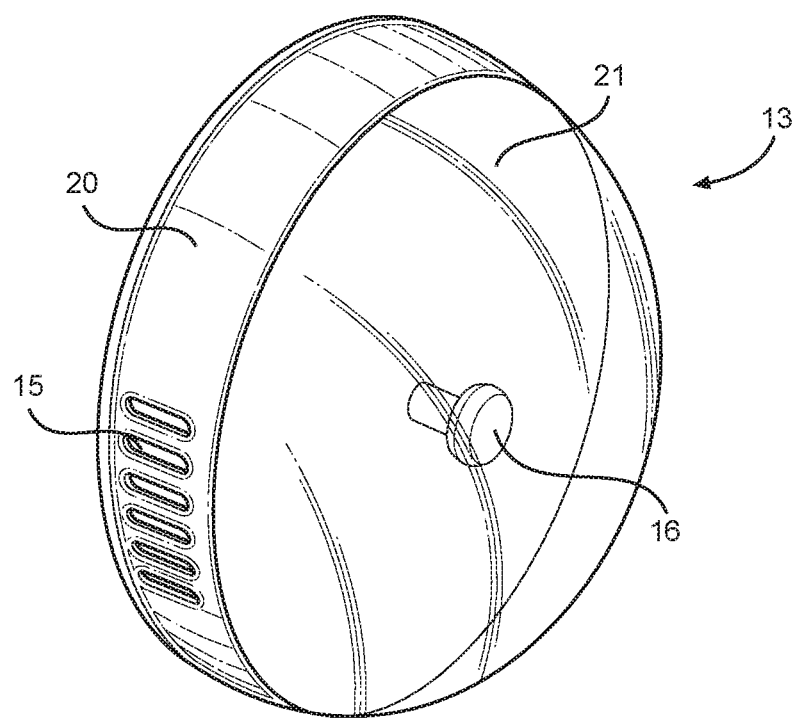
FIG. 2 shows a perspective view of a front external face of a camera of an embodiment of the programmable infrared security system.

Referring now to FIG. 2, there is shown a perspective view of a front external face of a camera of an embodiment of the programmable infrared security system. In one embodiment, the alarm system 13 is integrated into a multi-function unit. The unit comprises a housing 20 defining an interior cavity. A power source is disposed in the interior cavity. The power source is configured to supply power to each of the functional components disposed upon the multi-function unit.

The light 16 is disposed on a first external surface of the housing 20. The light 16 is operably connected to the power source. Furthermore, the light 16 is operably connected to the microcontroller such that the light 16 is activated when the alarm system is activated.

A protective cover 21 is also disposed on a first external surface of the housing 20. The protective cover 21 is configured to provide protection to the light 16. In one embodiment, the protective cover 21 is colored such that activation of the light 16 will cause the light 16 to appear in the color of the protective cover 21.

The speaker 15 is disposed on a side external surface of the housing 20. The speaker 15 is operably connected to the power source. Furthermore, the speaker 15 is operably connected to the microcontroller such that the speaker 15 is activated when the alarm system is activated.

Figure 3:
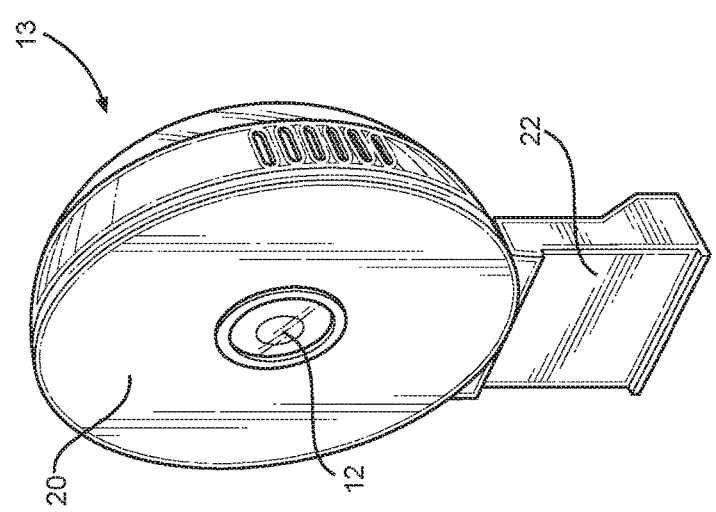
FIG. 3 shows a rear view of a camera of an embodiment of the programmable infrared security system.

Referring now to FIG. 3, there is shown a rear view of a camera of an embodiment of the programmable infrared security system. A lens of the camera 12 is disposed on a second external surface of the housing 20. The camera 12 is in operable communication with the power source. Furthermore, the camera 12 is in operable communication with the microcontroller, such that the microcontroller receives the video and infrared data from the camera. In one embodiment, a stand 22 is disposed on the bottom of the housing 20 such that the stand 22 provides support to the alarm system 13.

Figure 4:
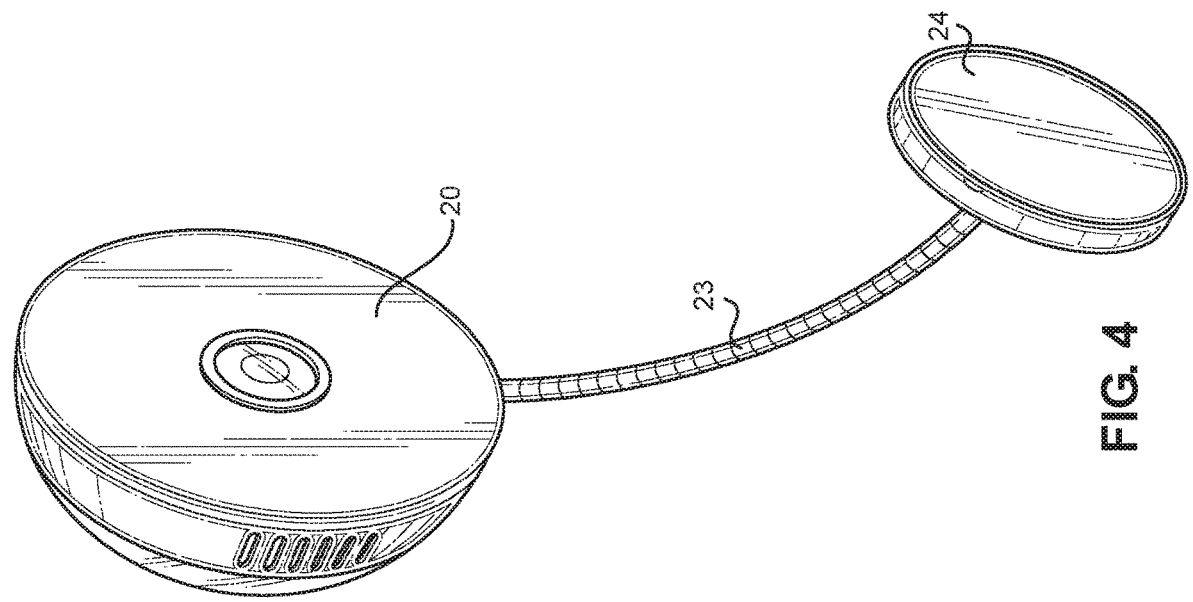
FIG. 4 shows a rear view of a camera of an embodiment of the programmable infrared security system.

Referring now to FIG. 4, there is shown a rear view of a camera of an embodiment of the programmable infrared security system. In one embodiment, the multi-function unit comprises an arm member 23 extending from an external surface of the housing 20. The arm member 23 is configured to provide structural support to the multi-function unit from a desired location. In another embodiment, a fastener 24 is disposed at an end of the arm member 23 opposite of the housing 20.

In another embodiment, the arm member 23 is configured to be adjustable. Adjustability of the arm member 23 provides convenience to a user, wherein the user wishes to install the multi-function unit in an area where the user wishes to freely redefine the defined area. The camera is adjustable by any known adjustability mechanism, including a manually-operated adjustability mechanism or an automatic or computer-assisted adjustability mechanism.

Figure 5:
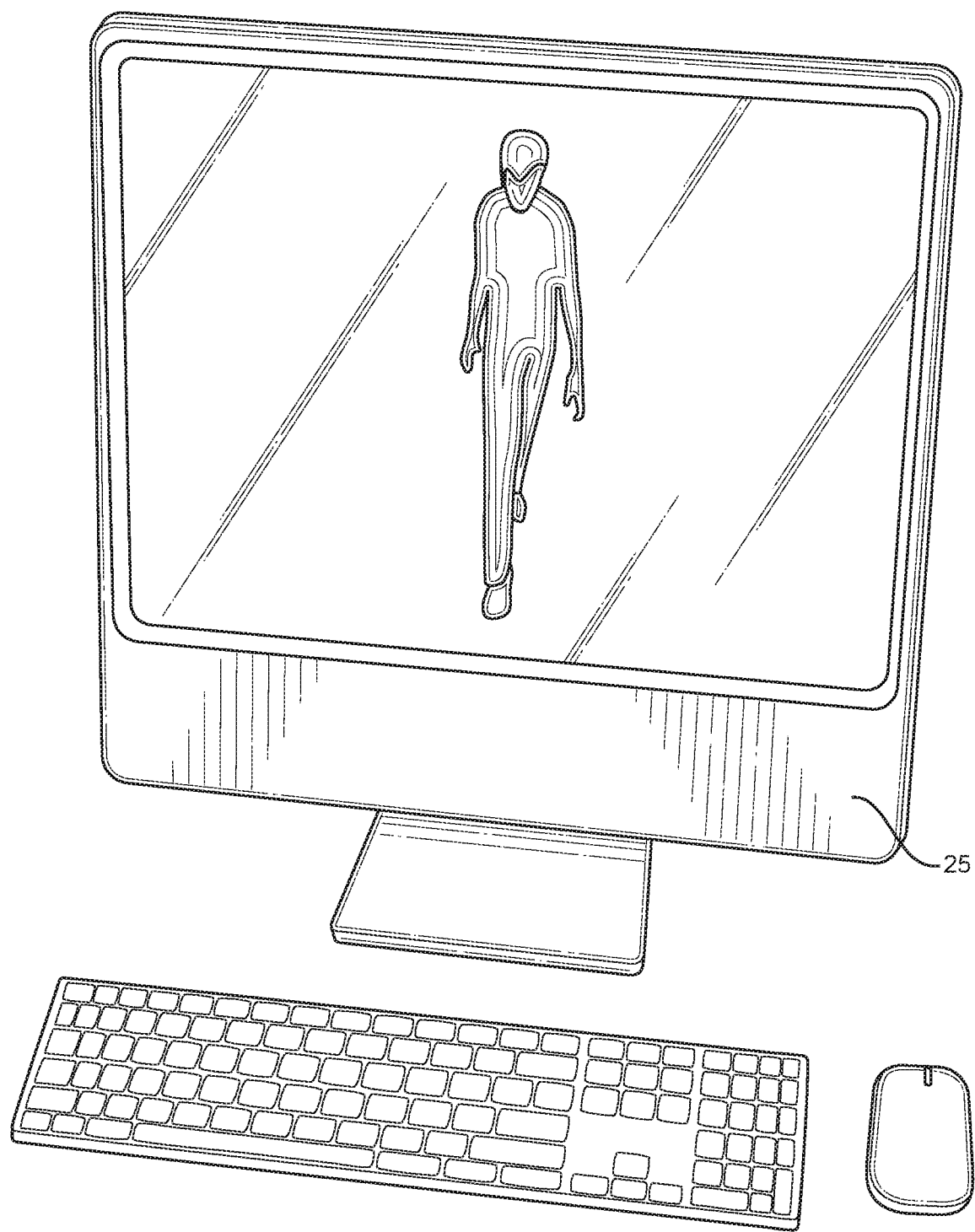
FIG. 5 shows a perspective view of a monitor of an embodiment of the programmable infrared security system.

Referring now to FIG. 5, there is shown a perspective view of a monitor of an embodiment of the programmable infrared security system. In one embodiment, the microcontroller is operably connected to a monitor 25. The monitor 25 is configured to show a video feed as gathered by the camera. In another embodiment, the monitor 25 is configured to be operably changeable between a standard video feed and an infrared video feed.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A security system, consisting of:
a camera operably connected to a microcontroller, the camera having an image sensor capturing an image and an infrared element determining and recording a temperature, wherein the captured image and the recorded temperature record an area of a same space;
wherein the image has a spatial element and an infrared temperature element;
a logic stored on a non-transitory computer readable medium executed at least in part by the microcontroller;
an alarm system configured to be triggered by an event corresponding to change in a recorded movement of the spatial element, an event corresponding to a change in infrared temperature, and an event corresponding to a combination of temperature changes and image changes;
the alarm system is configured to actuate a door lock operably connected to the microcontroller to emit an audible sound from a speaker operably connected to the microcontroller;
a light operably coupled to the microcontroller, wherein the light is activated when the alarm is triggered;
a monitor operably coupled to the camera, wherein the camera has a regular viewing mode and an infrared viewing mode;
wherein the camera is disposed in a housing;
wherein the housing is circular in shape;
the housing defining an interior cavity and a first external face opposite of a second external face;
the first external face is parallel to the second external face;
a power source disposed in the interior cavity;
the light is disposed on the first external face operably connected to the power source;
a protective covering disposed on the first external face to house the light therein;
wherein the protective covering is of a domed configuration;
wherein the speaker is disposed on a side external surface of the housing between the first external face and the second external face;
a camera lens disposed on the second external face;
wherein the second external face is opposite the first external face; and
wherein the microcontroller activates a recording protocol operably connected thereto when activating the alarm system to store at least one image from the camera on a storage unit.

2. The security system of claim 1, wherein the database includes a set of weapon profiles stored thereon.

3. The security system of claim 1, wherein the camera further comprises an arm member extending from the housing.

4. The security system of claim 3, wherein the arm member is adjustable.

5. The security system of claim 3, wherein a fastener is disposed at an end of the arm member opposite of the housing.

6. The security system of claim 1, wherein the microcontroller is operably connected to a monitor configured to show a video feed gathered by the camera.

7. The security system of claim 6, wherein the monitor is configured to be operably changeable between an unfiltered video feed and an infrared video feed.

8. The security system of claim 1, wherein the event threshold includes a change in both the images and the temperature.

9. The security system of claim 1, wherein the alarm is only triggered if there is more than one event.

10. The security system of claim 1, wherein the housing comprises a stand disposed on a bottom of the housing.

11. A security system, consisting of:
a camera operably connected to a microcontroller, the camera having an image sensor capturing an image and an infrared element determining and recording a temperature wherein the captured image and the recorded temperature record are of a same space;
wherein the image has a spatial element and an infrared temperature element;
a logic stored on a non-transitory computer readable medium executed at least in part by the microcontroller;
an alarm system configured to be triggered by an event corresponding to change in a recorded movement of the spatial element, an event corresponding to a change in infrared temperature, and an event corresponding to a combination of temperature changes and image changes;
the alarm system is configured to actuate a door lock operably connected to the microcontroller to emit an audible sound from a speaker operably connected to the microcontroller;
a light operably coupled to the microcontroller wherein the light is activated when the alarm is triggered;
a monitor operably coupled to the camera, wherein the camera has a regular viewing mode and an infrared viewing mode;
wherein the camera is disposed in a housing;
wherein the housing is circular in shape;
the housing defining an interior cavity and a first external face opposite of a second external face;
the first external face parallel to the second external face;
a power source disposed in the interior cavity;
the light is disposed on the first external face operably connected to the power source;
a protective covering disposed on the first external face configured to house the light therein;
wherein the protective covering is of a domed configuration;
wherein the speaker is disposed on a side external surface of the housing between the first external face and the second external face;
a camera lens disposed on the second external face;
wherein the second external face is defined opposite the first external face; and
wherein the protective covering is colored.

* * * * *